# United States Patent [19]

Tung

[11] 3,758,193

[45] Sept. 11, 1973

[54] INFRARED-TRANSMISSIVE, VISIBLE-LIGHT-ABSORPTIVE RETRO-REFLECTORS

[75] Inventor: Chi Fang Tung, Lincoln Township, Washington County, Minn.

[73] Assignee: Minnesota Mining and Manufacturing Company, Saint Paul, Minn.

[22] Filed: July 2, 1971

[21] Appl. No.: 159,196

[52] U.S. Cl. .................. 350/105, 350/1, 350/109
[51] Int. Cl. .......................................... G02b 5/12
[58] Field of Search .. 350/97–109, 1; 106/47, 52–54

[56] References Cited
UNITED STATES PATENTS 3,172,942  3/1965  Berg .................................... 350/105
3,249,947  5/1966  Williams ............................. 350/105
3,563,771  2/1971  Chi Fang Tung ..................... 350/1

Primary Examiner—David Schonberg
Assistant Examiner—Michael J. Tokar
Attorney—Kinney, Alexander, Sell, Steldt & Delahunt

[57] ABSTRACT

Retro-reflectors that incorporate, between the outer surface of the reflector and a reflective surface within the reflector, a thin layer of a material that transmits infrared radiation and substantially absorbs visible light. The layer comprises discrete, water-insoluble, organic, infrared-transmissive, visible-light-absorptive pigment particles dispersed in a matrix film having an index of refraction substantially the same as the index of refraction of the pigment particles and not substantially greater than the index of refraction of any material between the thin layer and said reflective surface.

6 Claims, 2 Drawing Figures

PATENTED SEP 11 1973 3,758,193

INVENTOR.
CHI FANG TUNG
BY Kinney, Alexander,
Sell, Steldt & DeLaHunt
ATTORNEYS

INFRARED-TRANSMISSIVE, VISIBLE-LIGHT-ABSORPTIVE RETRO-REFLECTORS

Tung, U.S. Pat. No. 3,563,771 discloses black glass elements such as spherical glass beads that are highly transmissive to "near" infrared radiation (having a wavelength of about 760 to 1,100 millimicrons) and highly absorptive of visible light (having a wavelength of 340 to 760 millimicrons). A principal use for those novel black spherical beads is in retro-reflective structures such as retro-reflective signs, labels, and coatings which incorporate the beads and reflective material underlying the beads. Such retro-reflective structures may be detected or read with infrared light sources and infrared detectors, making them useful in applications where the retroreflected signal should be a narrow-band signal that can be precisely sensed and in military or other applications where the detection or reading of the retro-reflective structure should be unobtrusive.

An important disadvantage of the use of black spherical glass beads in retro-reflectors is that a glass composition of a different index of refraction must be formulated for different retro-reflective constructions. For example, one index of refraction is needed for exposed-lens constructions in which the layer of beads is partially exposed, and a different index of refraction is needed if the beads are to be covered with a transparent, flat-surfaced sheeting. Or exposed-lens constructions use beads of different index of refraction depending on whether the construction is to reflect under dry or wet conditions.

This invention provides retro-reflectors that avoid the described disadvantage and reflect infrared radiation with good efficiency. Briefly, these new retro-reflectors comprise a base retro-reflective structure having a reflective surface that reflects radiation incident on it (such as the reflective surface provided by coating the back surface of spherical beads with aluminum), and a thin infrared-transmissive, visible light-absorptive layer coextensive with said reflective surface and disposed between said reflective surface and the exterior surface of the reflector through which radiation is received for reflection. This layer comprises an infrared-transmissive matrix film and solid, discrete, pigment particles of at least one water-insoluble, organic, infrared-transmissive, visible-light-absorptive pigment uniformly dispersed in the matrix film at a particle volume concentration between 0.5 and 20 percent. The matrix film has an index of refraction that is substantially the same as the index of refraction of the pigment and is not substantially greater than the index of refraction of any continuous layer of material between the layer and said reflective surface.

The use of pigment particles as described leads to a good transmission of infrared radiation while substantially absorbing visible light. The IR/IR+V discrimination ratio of the infrared-transmissive visible-light absorptive layer in a retro-reflector of the invention (that is, the ratio of infrared radiation transmitted to the combined total of infrared radiation and visible light transmitted) is at least 75 percent and preferably more than 90 percent.

Retro-reflectors of the invention may be inexpensively made in a variety of forms. For example, a retro-reflector of the invention can be conveniently made by covering the exterior surface of an existing retro-reflector with the described thin layer, and by this means nearly any existing retro-reflector can be converted to an infrared-transmissive, visible-light-absorptive retro-reflector. Thus, retro-reflectors can be made from flat-surfaced retro-reflective sheeting, exposed-lens sheeting, elastomeric sheeting, cube-corner reflectors, or retro-reflective surfaces originally formed by painting.

DETAILED DESCRIPTION

Figure 1:
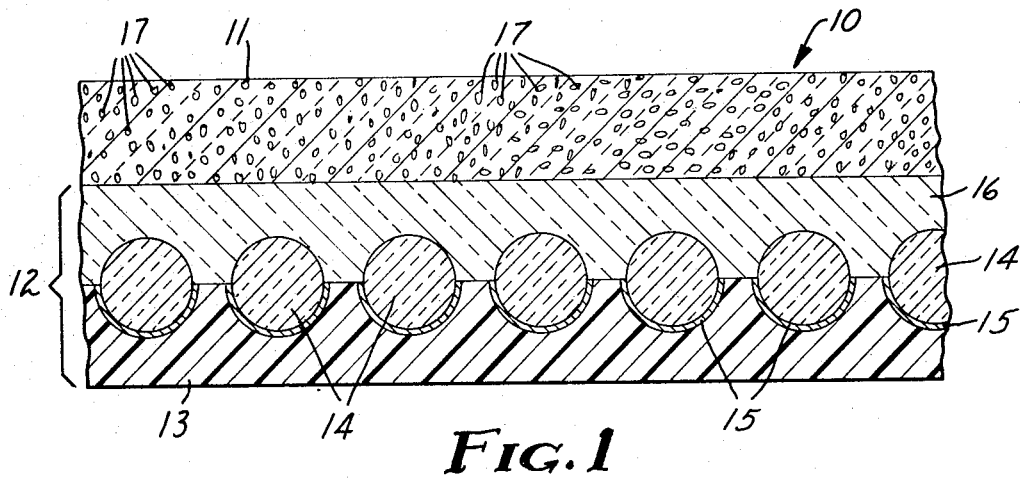

The drawings are cross-sections through illustrative infrared retro-reflective sheetings of the invention. The illustrative sheeting 10 of FIG. 1 comprises an infrared-transmissive, visible-light-absorptive layer 11 coated on a base retro-reflective sheet 12. The base sheet comprises a support layer 13; spherical, visibly transparent (that is, transmits visible light) glass beads 14 partially embedded in the support layer, with the embedded surface of the beads covered with a reflective material 15 such as aluminum to provide a reflective surface that returns radiation through the beads and layers 16 and 11; and a visibly transparent flat-surfaced exterior layer 16. The layer 11 comprises a matrix film in which pigment particles 17 of a water-insoluble organic pigment are dispersed.

Figure 2:
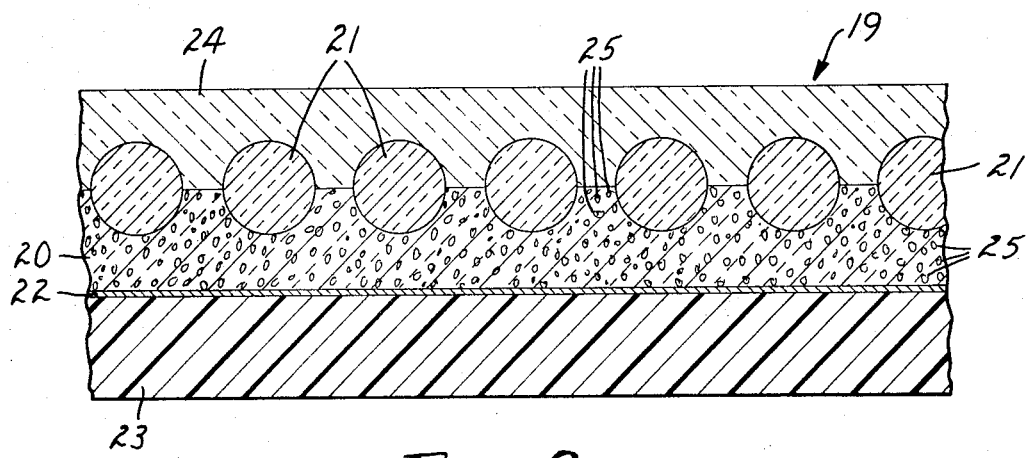

In the illustrative sheeting 19 shown in FIG. 2, a thin layer 20 of a material that transmits infrared radiation but substantially absorbs visible light is located internally in the sheeting between visibly transparent glass beads 21 and a reflective surface provided by a layer 22 of a material such as aluminum. The layer 22 is coated on a support layer 23, and the beads are covered with an exterior flat-surfaced layer 24. The layer 20 includes a matrix film and pigment particles 25.

The infrared-transmissive, visible-light-absorptive layer of a retro-reflector of the invention is prepared from a liquid composition that comprises a vehicle, which includes a binder material that will become the matrix film and usually a volatile thinner to dissolve or disperse the binder material, and the described pigment particles dispersed in the vehicle. The infrared-transmissive, visible-light-absorptive layer may be formed by directly coating the described liquid composition as one step during the sheet making operation, or the layer may be preformed and then applied to the base retro-reflective structure.

The binder material may be chosen from a wide variety of materials so long as its index of refraction is substantially the same as the index of refraction of the pigment dispersed in it and is not substantially greater than the index of refraction of any material between the matrix film and the reflective surface within the retro-reflector. For example, if the index of refraction of the pigment is 1.5, then the index of refraction of the binder material will preferably lie between 1.3 and 1.7 and more preferably between 1.45 and 1.55. And the index of refraction of the binder material will generally be not more than about 0.3 point higher, and preferably not more than about 0.1 point higher, than the index of refraction of any material between the matrix film and the reflective surface of the reflector. Both of the above conditions improve the transmission of infrared radiation through the layer. Most often, the matrix film is substantially transparent to visible light and the absorption of visible light is accomplished by the pigment. Typical suitable organic binder materials include alkyds, acrylics, drying oils, polyurethanes, epoxies, polystyrenes, and fluorinated polymers.

The term "organic pigment" as used in this specification means a water-insoluble, colored, organic material that exists in the matrix film in solid particulate form rather than solution form. The particles are generally of standard pigment sizes, usually less than 2 or 3 microns in diameter. The fact that the pigment is in an insoluble, solid, particulate form (as opposed to a dye, which substantially loses its crystalline particulate form in the matrix it is coloring, and develops very small sizes and very large surface areas) improves the weathering characteristics of retro-reflectors of the invention; for example, the pigment is not leached out of the matrix film during outdoor exposure. The organic pigment may comprise one substantially black pigment but generally comprises two or more pigments that each absorb a particular range of the visible spectrum of light. When two or more pigments are included, their proportions are chosen so that together they absorb a maximum amount of visible light while transmitting a maximum amount of infrared radiation. The total proportion of pigment in the matrix film is also chosen by balancing the facts that, on the one hand, the lower the number of particles the greater the infrared transmission, and on the other hand, the greater the number of particles the lower the visible transmission. The particle volume concentration—that is, the volume-percent that the pigment comprises of the combined total of pigment and matrix film—is generally between about 0.5 and 20 percent and preferably between about 1 and 10 percent.

The efficiency of the infrared transmission is also affected by the thickness of the infrared-transmissive, visible-light-absorptive layer. To maximize infrared transmission, this layer is generally less than 10 mils thick and preferably less than 3 mils thick; but it usually is at least 0.1 mil thick.

The invention will be further illustrated by the following example, which describes a set of organic pigments preferred for use in the invention. A vehicle comprising 60 parts by weight of an alkyd resin and 40 parts of xylol solvent was first prepared. Red (Lithosol Fast Scarlet), yellow (Benzedine Yellow), and blue (Heliogen Blue) pigments were mixed into the vehicle by known techniques to form a final coating composition in which the red pigment comprised 1.13 weight-percent of the composition, the yellow 1.41 weight-percent, and the blue 1.13 weight-percent. The pigments comprised slightly less than 5 volume-percent of the non-volatiles in the composition.

The IR/IR+V discrimination ratio for a layer of this composition coated on a clear glass plate was then tested, with transmission through the coated layer being compared with transmission through the glass plate with no layer coated on it. A set of tests were performed using different narrow bands of visible radiation, and the transmission data was plotted against wavelength. For the visible range tests the light source was a tungsten light (G.E. 1493 lamp masked to reveal a ½-inch-diameter aperture) at a color temperature of 2,850° K. covered by both a Wratten 106 filter and an appropriate sharp cut-off filter passing light in the desired narrow portion of the visible light band. The coated or uncoated glass plate being tested was laid over an R.C.A. No. 6199 phototube (S–11 response curve) masked to reveal a ½-inch-diameter aperture, and light from the source was passed through the glass plate to the phototube. The combination of the phototube and the Wratten 106 filter approximates the response of the average human eye, and therefore, the test measurement is directed proportional to the visibility to a human eye under such illumination.

For testing transmission in the near infrared region the radiation source was a tungsten light source (30-watt American Optical Company microscope illuminator with a GE 1493 lamp having a half-in-diameter aperture) at a color temperature of 2,650° K covered by an appropriate sharp cut-off infrared filter passing radiation in the desired narrow portion of the infrared band. Radiation transmitted was sensed with an R.C.A. phototube 7102 (S–1 response curve) having a ½-inch-diameter opening.

The test system was designed to permit the conversion of the measured values to values based on illumination providing radiant power of the same spectral intensity over the range of wavelengths tested. The resulting data was plotted as percent transmission (that is, amount transmitted through coated plate/amount transmitted through uncoated plate times 100) versus wavelength. The ratio of the area under the plotted curve of percent transmission versus wavelength over the range of infrared wavelengths to the area under the curve over the total visible and infared range is the IR/IR+V discrimination ratio. For this composition the IR/IR+V discrimination ratio was 96.6.

This coating composition was then knife-coated onto a flat-surfaced retro-reflective sheeting as shown in FIG. 1. In this sheeting the glass beads had an average diameter of about 50 microns with an index of refraction of 2.3, and the cover layer 15 had an index of refraction of 1.5. The index of refraction of the pigments was about 1.5 and the index of refraction of the alkyd resin was about 1.5. After the coated layer had been dried to remove solvent it had a thickness of 1–1.5 mils. The IR/IR+V discrimination ratio for the final product was approximately the same as that measured for the coating composition, and the product was useful as an infrared reflector.

What is claimed is:

1. An infrared-transmissive, visible-light-absorptive retro-reflector comprising a retro-reflective structure that includes within it a reflective surface that reflects radiation incident on the surface and a thin layer coextensive with said reflective surface and disposed between said reflective surface and the exterior surface of the reflector through which radiation is received for reflection comprising an infrared-transmissive matrix film and solid discrete pigment particles of at least one water-insoluble organic infrared-transmissive visible-light-absorptive pigment uniformly dispersed in the matrix film at a particle volume concentration between 0.5 and 20 percent, whereby the layer has an IR/IR+V discrimination ratio of at least 75 percent, the matrix film having an index of refraction that is substantially the same as the index of refraction of the pigment and not substantially greater than the index of refraction of any continuous layer between the matrix film and said reflective surface.

2. A reflector of claim 1 in which the thin layer forms said exterior surface of the reflector.

3. A reflector of claim 1 in which the thin layer is separated from said exterior surface by another layer of material.

4. A reflector of claim 3 in which a monolayer of spherical glass beads is disposed between said exterior and reflective surfaces.

5. Infrared-transmissive, visible-light-absorptive retro-reflective sheeting comprising 1) a base retro-reflective sheeting that incorporates a dense monolayer of visibly transparent retro-reflective spherical glass beads covered with a visibly transparent material that provides a flat exterior surface of the sheeting through which radiation is received for reflection, and 2) a layer between 0.1 and 10 mils in thickness adhered over said flat exterior surface comprising a matrix film and solid discrete pigment particles of at least one water-insoluble organic infrared-transmissive visible-light-absorptive pigment dispersed in the matrix film at a particle volume concentration between 0.5 and 20 percent, the matrix film having an index of refraction that is substantially the same as the index of refraction of the pigment and is not substantially greater than the index of refraction of said visibly transparent material, and the layer having an IR/IR+V discrimination ratio of at least 75 percent.

6. Retro-reflective sheeting of claim 5 in which the organic pigment includes Lithosol Fast Scarlet, Benzedine Yellow, and Heliogen Blue.

* * * * *